Patented July 3, 1934

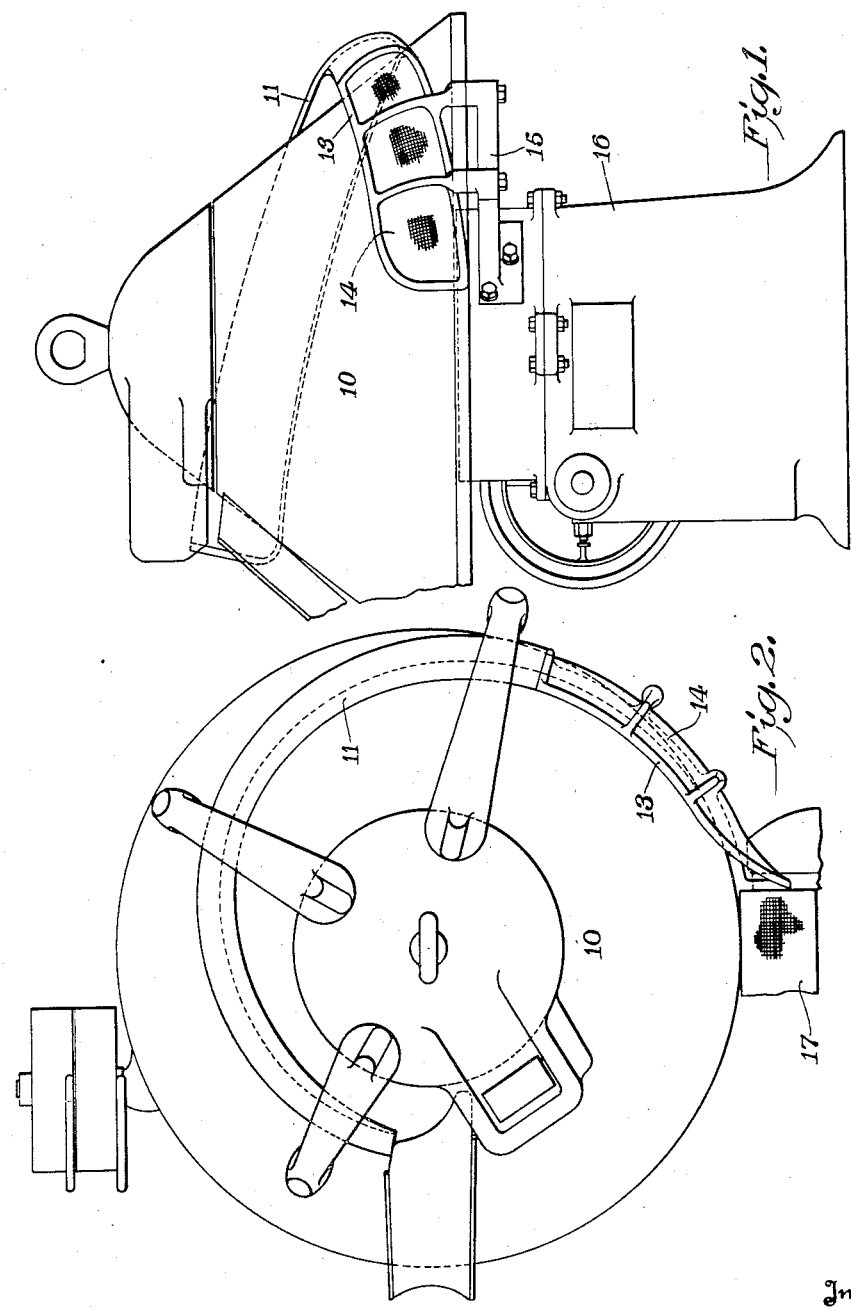

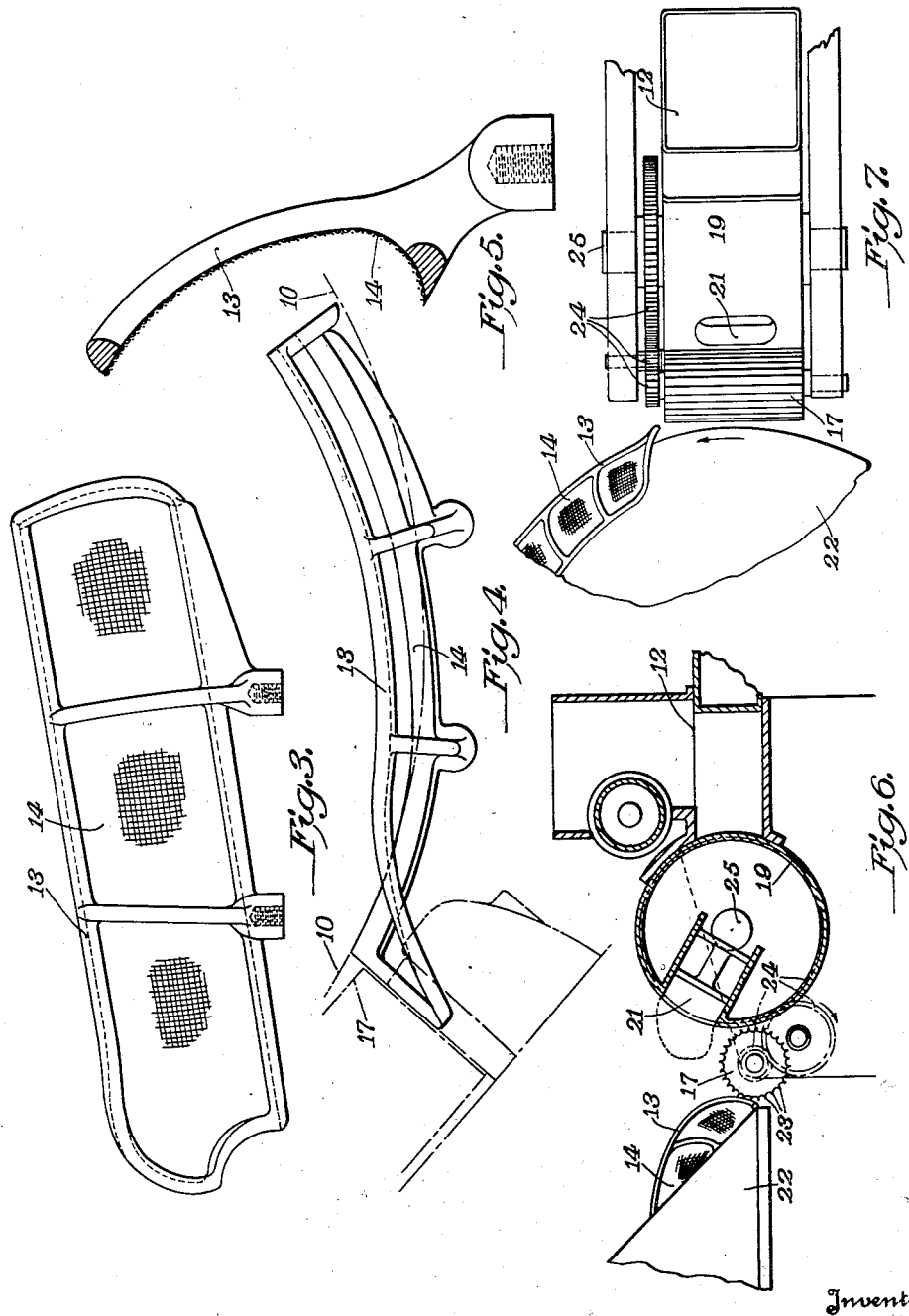

1,965,413

UNITED STATES PATENT OFFICE 1,965,413

DOUGH PIECE FORMING MACHINE

Laurence Seymour Harber and John Edward Pointon, Peterborough, England, assignors to Baker Perkins Company, Inc., Saginaw, Mich., a corporation of New York Application November 2, 1931, Serial No. 572,647
In Great Britain November 10, 1930

4 Claims. (Cl. 107—9)

This invention relates to machines for rounding or shaping dough pieces as received from a divider previous to their passage to a proofer, or for reshaping or moulding pieces as they are passed from one proofer to another.

The invention has particular reference to machines in which dough pieces are rolled between moving elements of cylindrical or other form, say, between a rotating cone, cylinder or table and a fixed trough or like member.

In machines for forming dough by rolling, the operative elements have plain working faces, or if provided with occasional grooves or teeth they are merely to afford roughness for increasing the rolling grip. It has been found that such plain or roughened surfaces in operation have a tendency to seize and smear the dough surface resulting in tearing or pulling the pieces so that they are either spoiled or imperfectly sealed by the rolling process. To mitigate this defect resort has had to be made to constant dusting with flour.

An object of the present invention is to remove these objections and to do away with the constant dusting by providing a novel surface for the operative elements. The nature of the surface precludes undesirable adhesion of the dough pieces by providing a substantially decreased area of working surface to contact with and mould the dough. It presents spaced contact lines and in addition gives access for air to the greater part of the surface of the dough during treatment.

Our invention comprises a dough contact element for use in a dough treating machine (such as, for example, a dough moulder or divider) adapted to present a minimum surface area for engagement by the dough, by being of open mesh, deeply reticulated or of grooved, lattice like or net work form, whereby undesirable adhesion is prevented and the dough surface is to a great extent exposed to the air.

The invention also comprises a dough moulding machine having relatively moving surfaces between which the dough pieces travel or are conveyed, wherein one or both surfaces present minimum area for engagement by the dough to prevent undue adhesion, by being of open work, deeply reticulated or grooved form.

The moulding machine may comprise a rotary conical table and a relatively fixed spiral trough, the receiving end of which is preferably formed by a cradle extension comprising an open work frame having a mesh fabric surface secured thereto.

The invention further comprises a dough divider comprising a rotary dividing head and a rotary transfer or delivery roller adapted to receive the divided pieces and deliver them to a moulding or other dough treating machine, the surface of the delivery roller being preferably formed with relatively deep longitudinal flutings whereby a minimum area is provided for engagement by the dough to prevent undue adhesion thereto.

In the accompanying drawings:

Figures 1 and 2 are respectively an elevation and plan of a conical table moulding machine or rounder having the improved construction of trough or cradle according to the invention.

Figures 3, 4 and 5 are detail views showing the preferred form of the cradle and discontinuous surface therefor.

Figures 6 and 7 are elevation and plan respectively showing the application of the invention to a delivery or transfer roller for transferring the divided pieces to a moulding machine or rounder.

In carrying the invention into effect according to one convenient mode as applied to a rounder having a conical table 10 and spiral trough 11 which receives dough pieces from a divider, the trough element is provided with a cage extension or cradle for receiving the dough pieces. This cradle according to a preferred form is constructed as a framework 13 upon which a wire mesh surface 14 is mounted and attached in any convenient manner.

The frame is fixed in position upon a bracket 15 carried by the standard or casing 16.

Instead of providing an independent cradle element, the whole of the spiral trough may be formed of a supporting framework having a wire mesh or grid applied thereto, the lower end being shaped to receive dough pieces from the roller 17 or conveyor delivering the pieces from the divider.

As an alternative to the open frame form of cradle or trough above described the usual trough for the lower portion or the whole of its length may be lined with an open work mesh fabric or grid which may be spaced from the trough surface or lie contiguous thereto.

The conical table 10, if desired, may also be provided with a wire net covering or it may be formed hollow with a mesh or grid surface.

The cage form of element affords freer access for air but it will be apparent that in the case of the usual elements having a wire mesh lining there is also access of air to the dough surface through the spaces between the ribs or wires.

Instead of providing a mesh or net having crossing strands of wire, the trough 11 and/or cradle may be provided with a series of spaced parallel wires arranged at right angles to the course of travel of the dough, or obliquely transverse thereto. In the case of a conical table such wires may lie radially of the cone and may be of rounded knife edge formation in order to afford the necessary resistance and support.

Where cylindrical elements are used for operating upon the dough these may be of net or squirrel cage form, either as a lining for a drum or as a net-work cylinder. In conjunction with a conical rounder such as shown in Figs. 1 and 6 the roller or conveyor that delivers dough pieces from the divider to the rounder may be of similar network, squirrel cage or like form.

According to a modification, instead of lining the working surfaces with applied nets or grids, they may be deeply grooved or incised on lines in parallel or crossing relationship so as to present a surface having a multitude of ribs or isolated pyramids or nodules, whereby a discontinuous surface is presented to the dough so as to afford access for air between the ribs or spots that contact with the dough.

Figures 6 and 7 show an arrangement in which a dough divider having a rotary dividing head 19 is provided with a rotary transfer roller 17 by which the measured dough piece ejected from the chamber 21 is transferred to the moulding machine 22. The roller 17 has its cylindrical surface formed with longitudinal grooves or flutings providing a series of spaced ribs 23. Alternatively the surface may have crossing grooves to provide isolated pyramids or the like. Or, otherwise, the surface of the roller may be covered by a wire mesh fabric or the roller itself may be made of skeleton formation with a mesh fabric applied thereto.

Roller 17 is driven by spur gearing 24 from the driving spindle 25 which is also geared to the rotary head 19, the gear ratios being such that the speed of the roller 17 is considerably faster than that of the rotary head.

The divider and conveying or transfer roller are shown in the figures in association with a moulding machine of the type illustrated in Figures 1-5, but obviously they may be applied to other types of moulding or dough treating machines.

Having thus described our invention, what we claim and desire to secure by Letters Patent is:

1. A dough moulding machine comprising a rotary conical table and a relatively fixed spiral trough, the dough contacting surface of said trough being deeply reticulated to present minimum area for engagement with the dough pieces and likewise to present passages for access of air to the areas of the dough pieces in contact with said elements.

2. A dough moulding machine having relatively moving surfaces between which the dough pieces roll, wherein said surfaces are of open work having mounted thereon a structure of open wire mesh presenting minimum area for contact with the dough, whereby to prevent undue adhesion and permit access of air to the faces of the dough pieces in contact with said mesh.

3. A rotary transfer element adapted to receive divided dough pieces from a dough treating machine and to support and convey them to a dough moulding machine, said element being mounted for rotation about a horizontal axis, the surface of the said transfer element being formed of wire mesh so as to present minimum area for engagement with the dough pieces whereby to prevent undue adhesion and likewise to present passages for access of air to the areas of the dough pieces in contact with said element.

4. In a dough molding machine including a conical rotary table, a relatively fixed spiral moulding trough having at its receiving end an open framework and a lattice-like open wire mesh secured to said framework, said mesh arranged to present passages for access of air to the area of the dough pieces in contact therewith.

JOHN EDWARD POINTON.
LAURENCE SEYMOUR HARBER.